United States Patent
Lee

(10) Patent No.: US 10,853,917 B2
(45) Date of Patent: Dec. 1, 2020

(54) COLOR IMAGE AUTHENTICATION METHOD BASED ON PALETTE COMPRESSION TECHNIQUE

(71) Applicant: NATIONAL KAOHSIUNG UNIVERSITY OF SCIENCE AND TECHNOLOGY, Kaohsiung (TW)

(72) Inventor: Che-Wei Lee, Kaohsiung (TW)

(73) Assignee: NATIONAL KAOHSIUNG UNIVERSITY OF SCIENCE AND TECHNOLOGY, Kaohsiung (TW)

(*) Notice: Subject to any disclaimer, the term of this patent is extended or adjusted under 35 U.S.C. 154(b) by 94 days.

(21) Appl. No.: 16/241,959

(22) Filed: Jan. 7, 2019

(65) Prior Publication Data
US 2019/0213711 A1 Jul. 11, 2019

(30) Foreign Application Priority Data
Jan. 8, 2018 (TW) .............................. 107100683 A

(51) Int. Cl.
*G06K 9/36* (2006.01)
*G06T 3/40* (2006.01)
(Continued)

(52) U.S. Cl.
CPC ............ *G06T 3/4092* (2013.01); *G06F 16/51* (2019.01); *G06T 1/0028* (2013.01); *G06T 3/4007* (2013.01); *G06T 9/00* (2013.01); *H04N 19/00* (2013.01); *G06T 2201/0051* (2013.01); *G06T 2201/0061* (2013.01); *G06T 2201/0081* (2013.01); *G06T 2201/0201* (2013.01); *G06T 2201/0203* (2013.01)

(58) Field of Classification Search
CPC ....... G06T 3/4092; G06T 1/0028; G06T 9/00; G06T 3/4007; G06T 2201/0201; G06T 2201/0061; G06T 2201/0081; G06T 2201/0051; G06T 2201/0203; G06T 9/005; H04N 19/00; G06F 16/51
See application file for complete search history.

(56) References Cited

U.S. PATENT DOCUMENTS 10,484,686 B2 * 11/2019 Xiu ...................... H04N 19/176
10,623,468 B1 * 4/2020 Rappaport .......... H04L 67/1097
(Continued)

OTHER PUBLICATIONS

Junhui He, Weiquiang Lam, Shaohua Tang, A secure image sharing scheme with high quality stego images basd on steganography, Mar. 14, 2016, School of computer science and engineering, South China University of Technology, Guangzhou Higher education Mega center, Multimedia Tools, Springer (Year: 2017).*

*Primary Examiner* — Dhaval V Patel
(74) *Attorney, Agent, or Firm* — CKC & Partners Co., LLC

(57) ABSTRACT

An image authentication method is provided. An original image is divided into blocks. An interpolation algorithm is performed on each block so as to obtain a first image. Each pixel in the first image is mapped into an index based on a palette compression technique, so as to generate a second image. Each index is divided into multiple secret values, and a secret sharing algorithm is performed based on the secret values to obtain multiple partial shares. A transparent map is generated according to the partial shares, and a lossless image filed is generated by combining the original image with the transparent map.

5 Claims, 4 Drawing Sheets

(51) Int. Cl.
*G06F 16/51* (2019.01)
*G06T 1/00* (2006.01)
*H04N 19/00* (2014.01)
*G06T 9/00* (2006.01)

(56) References Cited

U.S. PATENT DOCUMENTS

2016/0029030 A1* 1/2016 Mrak .................. H04N 19/503
375/240.12
2018/0158377 A1* 6/2018 Ikarashi .................. G09C 1/00

* cited by examiner

COLOR IMAGE AUTHENTICATION METHOD BASED ON PALETTE COMPRESSION TECHNIQUE

RELATED APPLICATIONS

This application claims priority to Taiwan Application Serial Number 107100683 filed Jan. 8, 2018, which is herein incorporated by reference.

BACKGROUND

Field of Invention

The present invention relates to a scheme for authentication and recovery of an image. More particularly, the present invention relates to an image authentication method using a secret sharing algorithm.

Description of Related Art

More and more digital images are accessible on the Internet these days. However, how to confirm the authenticity and integrity of these digital images (i.e. they have not been tampered) has always been an important issue. In general, some additional information is hidden in the image, which will change the original pixels in the image and reduce the image quality, in order to achieve the authentication/recovery function. The pixel change rate is higher for the authentication function of a color image than a greyscale image, and more information is required to be hidden into the color image if the recovery function is also needed that will reduce the visual quality severely. Therefore, how to balance the function and visual quality of images is a major focus of technology development. In addition, some conventional technologies do not have all of three characteristics of lossless, authentication, and recovery.

SUMMARY

Embodiments of the present disclosure provide an image authentication method for a computer system. The image authentication method includes: obtaining a first original image, and dividing the first original image into multiple blocks; performing an interpolation algorithm to each of the blocks to obtain a first image; mapping each pixel of the first image into an index based on a palette to generate a second image; dividing each of the indexes of the second image into multiple secret values, and performing a secret sharing algorithm according to the secret values to obtain multiple partial shares, in which a number of the partial shares is equal to a number of pixels in each of the blocks; and generating a transparent map according to the partial shares, and combining the first original image with the transparent map to generate a lossless compressed image file.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
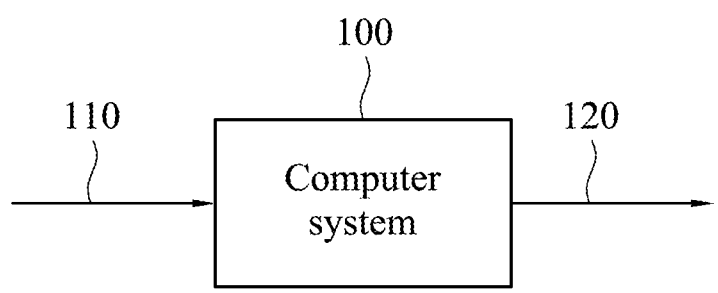
FIG. 1 is a schematic diagram of a computer system in accordance with an embodiment.

FIG. 1 is a schematic diagram of a computer system in accordance with an embodiment. Referring to FIG. 1, a computer system 100 is configured to perform an image authentication method. The computer system 100 may be implemented as a smart phone, tablet, personal computer, laptop, server, industrial computer, etc. which is not limited in the invention. The computer system 100 obtains an original image 110 which may a color image or a greyscale image. The computer system 100 would output a lossless compressed image file 120 including the original image 110 and an additional transparent map (also referred to an alpha channel) having levels of transparency of the image. For example, the lossless compressed image file 120 complies with a portable network graphics (PNG) file format. In other embodiments, another compression format with a transparent map may be adopted. In particular, the information of the transparent map is used to authenticate and recovery tempered pixels of the original image 110.

A secret sharing algorithm is adopted to authenticate and recovery the image, and thus the secret sharing algorithm is described first. In the embodiment, the secret sharing algorithm is a (k,n) threshold secret sharing algorithm. In general, the (k,n) threshold secret sharing algorithm transforms a secret into n shares and spread them to n participants where n is a positive integer. The secret is reconstructed by k or more than k shares where k is a positive integer smaller than n. Herein, the secret is represented as an integer d. A prime number p is chosen randomly where p>d. Next, (k−1) integers are selected as $c_1, c_2, \ldots, c_{k-1}$, and n different real numbers are selected as $x_1, x_2, \ldots, x_n$ which are also called coefficients. Next, $F(x_i)$ (also referred to partial shares) are calculated by the following equation (1) where i=1, 2, ..., n.

$$F(x_i) = (d + c_1 x_i + c_2 x_i^2 + \ldots + c_{k-1} x_i^{k-1})_{mod\ p} \qquad (1)$$

$(x_i, F(x_i))$ is called a share which is transmitted to $i^{th}$ participant. Since there are k coefficients (including d and $c_1, c_2, \ldots, c_{k-1}$) in the equation (1), k shares are required to solve the equation (1) and reconstruct the secret d. However, person in the art should be able to understand the (k,n) threshold secret sharing algorithm, and therefore the detail for reconstructing the integer d and the coefficients $c_1, c_2, \ldots, c_{k-1}$ will not be described herein.

Figure 2:
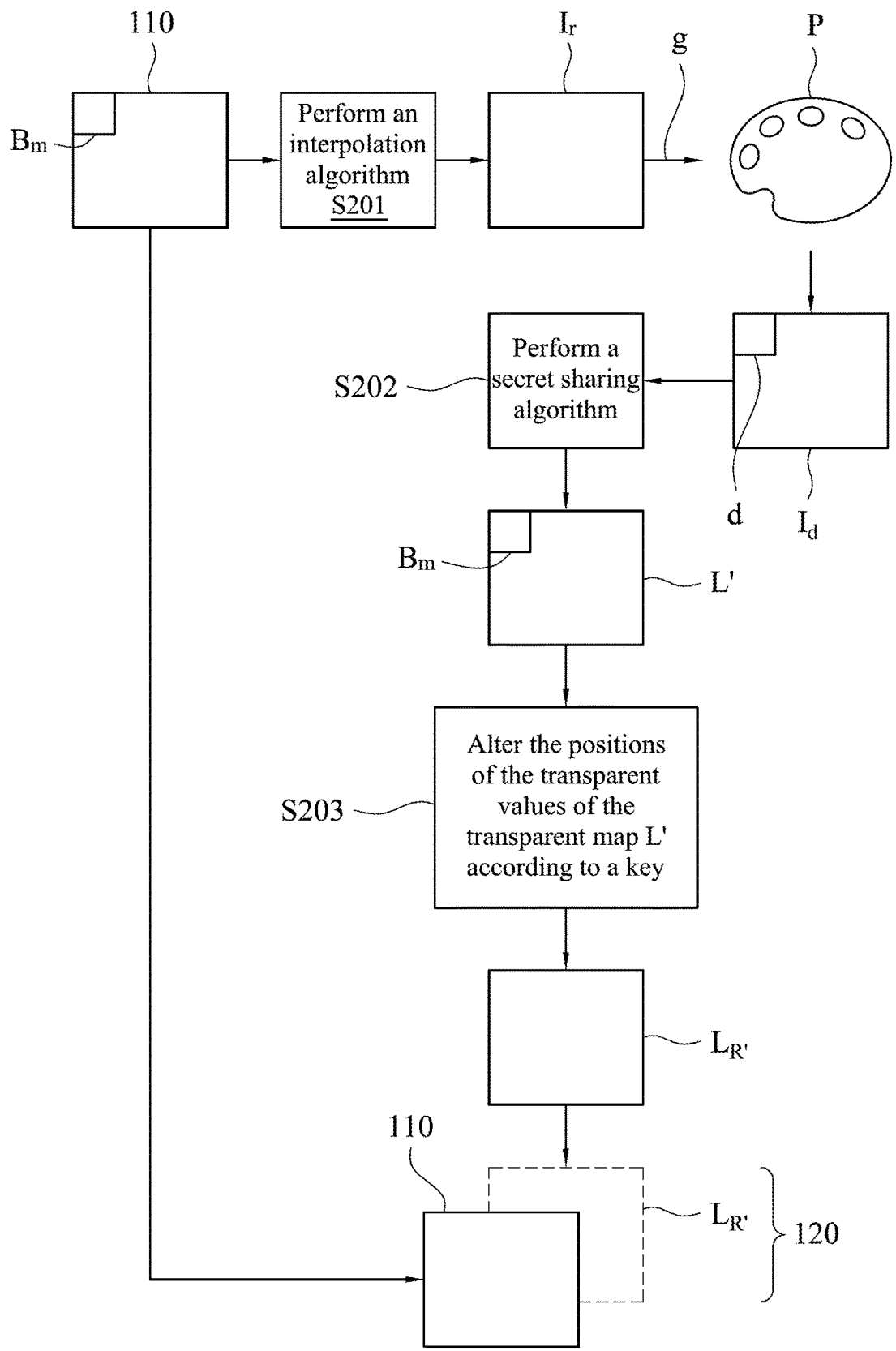
FIG. 2 is a schematic flow chart for generating a lossless compressed image file in accordance with an embodiment.

FIG. 2 is a schematic flow chart for generating a lossless compressed image file in accordance with an embodiment.

Referring to FIG. 2, the original image 110 (also referred to a first original image) is obtained. The original image 110 may be a color image, and that is, the original image 110 has channels of red, green, and blue. Next, the original image 110 is divided into blocks in which the size of each block may be 2 by 2 (i.e. 2×2) such as a block $B_m$.

In a step S201, an interpolation algorithm is performed on the four pixels of each block to calculate one pixel of an image $I_r$ (also referred to a first image). For example, the interpolation algorithm is a bicubic interpolation for interpolating one pixel among the four pixels of one block. Note that the width and height of the image $I_r$ are half of that of the image 110 because the size of each block is 2×2.

Each pixel of the image $I_r$ is mapped into an index based on a palette P, and thus generating an image $I_d$ (also referred to a second image). For example, a pixel g is mapped into an index d. Note that the pixel g has three channels of red, green, and blue, but the index d is a single integer (e.g. ranged from 0 to 255). The content of the palette P is not limited in the invention. Note that the palette P is reversible, and that is, the pixel g may be obtained according to the index d.

In a step S202, the secret sharing algorithm is performed. Take the index d as an example in which the position of the index d corresponds to the position of the block $B_m$. First, the index d is divided into multiple secret values. For example, the index d is represented as 8 bits $p_1 p_2 \ldots p_8$, and several most significant bits (MSB) are set to be a first secret value written as $m_1 = p_1 p_2 p_3 p_4$. In addition, several least significant bits (LSB) of the index d are set to be a second secret value written as $m_2 = p_5 p_6 p_7 p_8$. The two secret values are transformed into decimal numbers. Referring to the equation (1), the values are set as: p=17, d=$m_1$, $c_1$=$m_2$, $x_1$=1, $x_2$=2, $x_3$=3, and $x_4$=4 in one embodiment. After the equation (1) is performed, the partial shares $F(x_i)$ where i=1, 2, 3, 4 can be obtained. Note that each index d corresponds to four partial shares $F(x_i)$, and in other words, the number of the partial shares $F(x_i)$ for one index is equal to the number of pixels in the block $B_m$. From another aspect, (k=2,n=4) is adopted in the (k,n) threshold secret sharing algorithm.

A transparent map L' (also referred to an alpha channel) is generated according to the partial shares $F(x_i)$. In the embodiment, each partial share $F(x_i)$ is added to a predetermined value to obtain a transparent value of the transparent map L'. For example, the partial shares $F(x_i)$ are ranged from 0 to 16 because the prime number p is equal to 17, and the predetermined value may be 238. Accordingly, the transparent values are ranged from 238 to 254. In addition, the positions of the four transparent values generated according to the index d correspond to the position of four pixels of the block $B_m$. After the step S202 is performed on each index of the image $I_d$, the transparent map L' is generated with the same size as the size of the original image 110. From another aspect, the step S202 is used to divides the index d into several secrets and spread the secrets into the transparent values of the transparent map L'.

In a step S203, the positions of the transparent values of the transparent map L' are altered according to a key to obtain a transparent map $L_{R'}$. This step is used to further protect the authentication information. In some embodiments, the step S203 may be omitted. At last, the original image 110 is combined with the transparent map $L_{R'}$ to generate the lossless compressed image file 120 (e.g. a PNG file).

Note that the values of the prime number p, the real numbers $x_1, x_2, \ldots, x_n$, and the size of the blocks can be modified arbitrarily in other embodiments. For example, if the size of the blocks is 3×3, then (k,n) may be set to be (4,9), (5,9), or other combinations that means one index is divided into 4 or 5 secret values in the S202. A total of 9 partial shares $F(x_i)$ can be generated according to the secret values by performing the (k,n) threshold secret sharing algorithm. If the prime number p is set to be 23, the partial shares $F(x_i)$ are ranged from 0 to 22, and therefore the predetermined value for calculating the transparent values may be equal to 232, resulting in that the transparent values are ranged from 232 to 254. People in the art should be able to devise other embodiments based on these disclosures.

Figure 3:
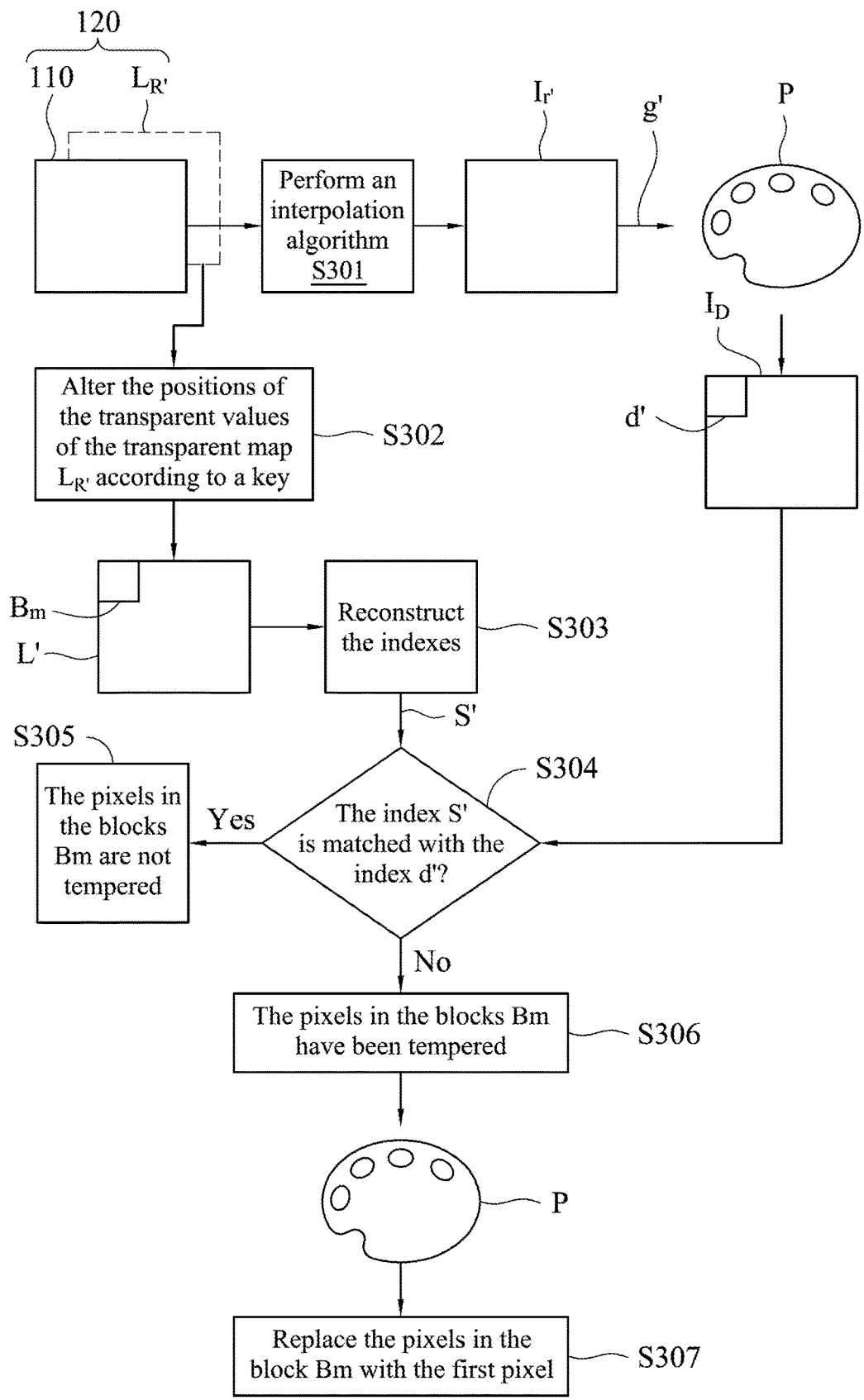
FIG. 3 is a schematic flow chart for determining whether an image is tempered and recovering the image in accordance with an embodiment.

FIG. 3 is a schematic flow chart for determining whether an image is tempered and recovering the image in accordance with an embodiment. Referring to FIG. 3, the transparent map $L_{R'}$ and the original image 110 are obtained from the lossless compressed image file 120. Since the transparent map $L_{R'}$ and the original image 110 may be tempered, they are referred to a second transparent map and a second original image, respectively. The original image 110 and the transparent map $L_{R'}$ are divided into multiple blocks with the same size as that adopted in FIG. 2. In a step S301, the interpolation algorithm, which is the same algorithm as that adopted in the step S201, is performed on each block of the original image 110 to obtain an image $I_{r'}$ (also referred to a third image). Each pixel of the image $I_{r'}$ is mapped into an index (also referred to a second index) based on the same palette P to generate an image $I_D$ (also referred to a fourth image). For example, a pixel g' of the image $I_{r'}$ is mapped into an index d' of the image $I_D$.

On the other hand, in a step S302, positions of the transparent values of the transparent map $L_{R'}$ are altered according to the same key which is adopted in the step S203 to obtain a transparent map L' (also referred to a third transparent map). In a step S303, the indexes are reconstructed. Take the block $B_m$ corresponding to the index d' as an example, two transparent values are selected from the blocks $B_m$. The selected transparent values should be ranged from 238 to 254. The predetermined value (e.g. 238) is subtracted from each of the two transparent values to obtain two partial shares $F(x_i)$ (also referred to second partial shares). If the block $B_m$ does not have two transparent values ranged from 238 to 254, it means the blocks $B_m$ has been tempered. Next, the two obtained partial share $F(x_i)$ and corresponding $x_i$ are substituted into the equation (1) to reconstruct the secret values d, $c_1$ (also referred to second secret values) which are both binary numbers with 4 bits. By connecting the two binary numbers, a binary number with 8 bits is obtained and the decimal value thereof is referred to an index S' (also referred to a third index). After the step S303 is performed to each block of the transparent map L', a step S304 is performed.

In the step S304, whether the index S' is matched with the index d' is determined (i.e. determining whether they are the same). If the index S' is matched with the index d', in a step S305, determining that the pixels in the blocks $B_m$ are not tempered. If the index S' does not match with the index d', in a step S305, determining that the pixels in the blocks $B_m$ have been tempered, that is, the lossless compressed image file 120 is tempered. Recovery of the tempered pixels is described herein. For the tampered block $B_m$, the index d' is mapped into a first pixel (having multiple channels) based on the palette P. In a step S307, the four pixels in the block $B_m$ of the original image 110 are all replaced with the first pixel.

Figure 4:
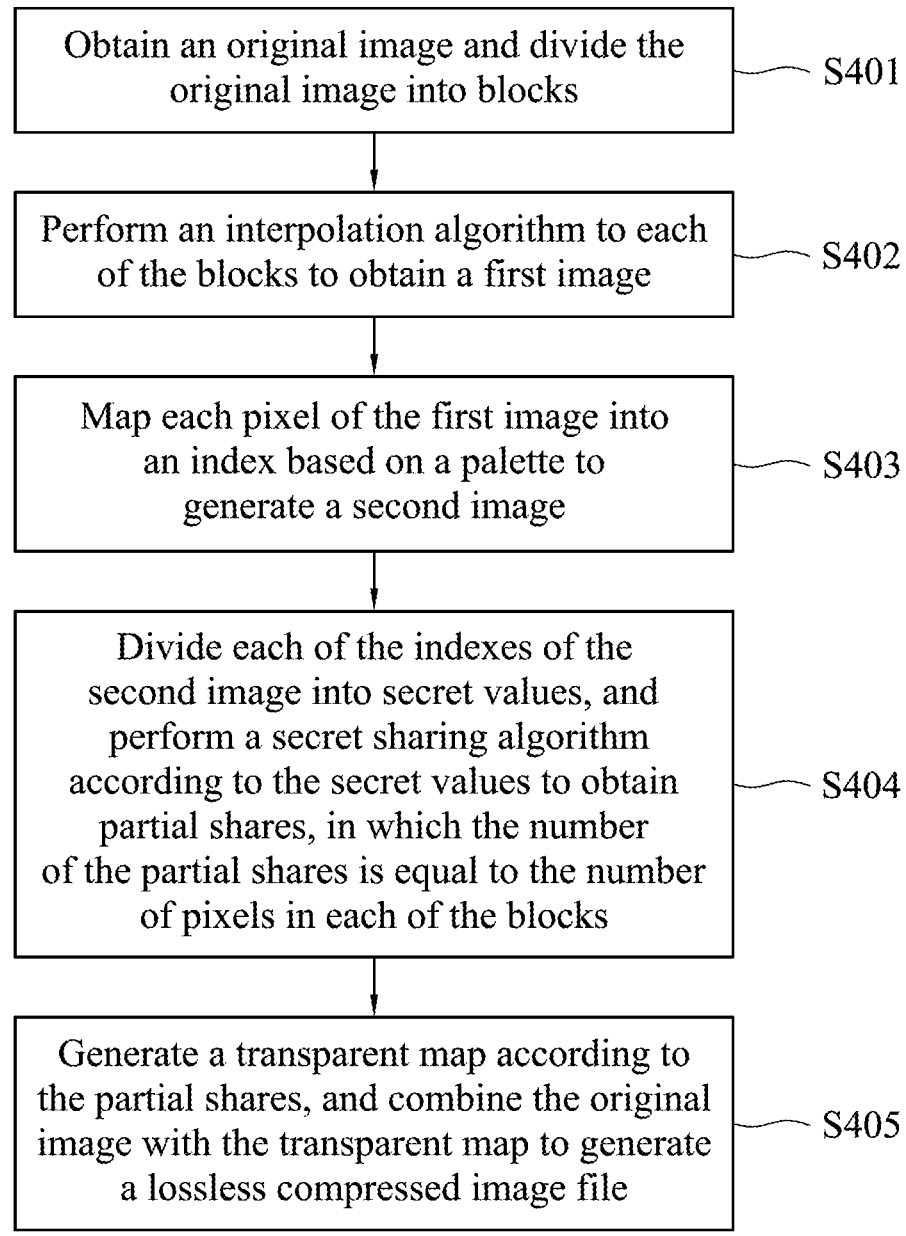
FIG. 4 is a schematic flow chart of an image authentication method in accordance with an embodiment.

FIG. 4 is a schematic flow chart of an image authentication method in accordance with an embodiment. Referring to FIG. 4, in a step S401, an original image is obtained and divided into blocks. In a step S402, an interpolation algorithm is performed to each of the blocks to obtain a first image. In a step S403, each pixel of the first image is mapped into an index based on a palette to generate a second image. In a step S404, each of the indexes of the second image is divided into secret values, and a secret sharing algorithm is performed according to the secret values to obtain partial shares, in which the number of the partial shares is equal to the number of pixels in each of the blocks. In a step S405, a transparent map is generated according to the partial shares, and the original image is combined with the transparent map to generate a lossless compressed image file. However, all the steps in FIG. 4 have been described in detail above, and therefore they will not be repeated. Note that the steps in FIG. 4 can be implemented as program codes or circuits, and the disclosure is not limited thereto. In addition, the method in FIG. 4 can be performed with the aforementioned embodiments, or can be performed independently. In other words, other steps may be inserted between the steps of the FIG. 4.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image authentication method for a computer system, wherein the image authentication method comprises:
   obtaining a first original image, and dividing the first original image into a plurality of blocks;
   performing an interpolation algorithm to each of the blocks to obtain a first image;
   mapping each pixel of the first image into an index based on a palette to generate a second image;
   dividing each of the indexes of the second image into a plurality of secret values, and performing a secret sharing algorithm according to the secret values to obtain a plurality of partial shares, wherein a number of the partial shares is equal to a number of pixels in each of the blocks; and
   generating a transparent map according to the partial shares, and combining the first original image with the transparent map to generate a lossless compressed image file,
   wherein the step of generating the transparent map according to the partial shares comprises:
      adding each of the partial shares and a predetermined value to obtain a plurality of transparent values; and
      altering positions of the transparent values according to a key to obtain the transparent map,
   wherein the image authentication method further comprises:
      obtaining a second transparent map and a second original image from the lossless compressed image file;
      dividing the second original image and the second transparent map into a plurality of second blocks;
      performing the interpolation algorithm to each of the second blocks of the second original image to obtain a third image;
      mapping each pixel of the third image into a second index based on the palette to generate a fourth image;
      altering positions of transparent values of the second transparent map according to the key to obtain a third transparent map;
      for each of the second blocks, obtaining a plurality of second partial shares from the third transparent map, obtaining a plurality of second secret values according to the secret sharing algorithm and the second partial shares, and obtaining a third index according to the second secret values;
      determining whether the third index is matched with a corresponding one of the second indexes; and
      if the third index is not matched with the second index, determining that the lossless compressed image file is tempered.

2. The image authentication method of claim 1, wherein a size of each of the blocks is 2 by 2, a number of the secret values for one of the indexes is equal to 2, and the secret sharing algorithm is a (k,n) threshold secret sharing algorithm, where k and n are positive integers and k<n.

3. The image authentication method of claim 1, wherein the step of dividing each of the indexes of the second image into the secret values comprises:
   setting a plurality of most significant bits of one of the indexes as a first secret value; and
   setting a plurality of least significant bits of one of the indexes as a second secret value.

4. The image authentication method of claim 1, wherein the lossless compressed image file complies with a portable network graphics (PNG) file format.

5. The image authentication method of claim 1, further comprising:
   if determining that the lossless compressed image file is tempered, mapping a tempered one of the second indexes into a first pixel, and replace corresponding pixels of the second original image with the first pixel.

* * * * *